United States Patent [19] [11] Patent Number: 4,849,843
Fujita et al. [45] Date of Patent: Jul. 18, 1989

[54] DEMAGNETIZER FOR A MAGNETIC HEAD OF A CASSETTE TAPE RECORDER

[75] Inventors: Motoyoshi Fujita, Chiba; Akikazu Kunuki, Funabashi; Noboru Uemura, Odawara; Tsutomu Kotani, Kamagaya; Shunpei Saeki, Chiba; Toshiharu Kawano, Tokyo, all of Japan

[73] Assignee: TDK Corporation, Tokyo, Japan

[21] Appl. No.: 289,410

[22] Filed: Dec. 21, 1988

Related U.S. Application Data

[63] Continuation of Ser. No. 67,613, Jun. 26, 1987, abandoned.

[30] Foreign Application Priority Data

Jun. 27, 1986 [JP] Japan ............................. 61-97794[U]

[51] Int. Cl.⁴ .......................................... G11B 5/465
[52] U.S. Cl. .................................................. 360/128
[58] Field of Search .......................................... 360/128

[56] References Cited

U.S. PATENT DOCUMENTS 4,135,219  1/1979  Yoshizawa ........................... 360/128
4,454,551  6/1984  Clausen ........................... 360/128 X
4,470,089  9/1984  Hutchins ........................... 360/128

FOREIGN PATENT DOCUMENTS 1076583  3/1988  Japan .

Primary Examiner—A. J. Heinz
Attorney, Agent, or Firm—Burgess, Ryan and Wayne

[57] ABSTRACT

A magnetic head of a cassette tape recorder set is demagnetized by a demagnetizer mounted in a tape cassette housing. The demagnetizer has an erase head which faces with the magnetic head which is subject to a demagnetizing action, a pair of rotatable rings which engage with spindles of the tape recorder set, energizing means for energizing said erase head with AC decreasing current, and coupling means for coupling said rings for simultaneous rotation of the rings.

5 Claims, 4 Drawing Sheets

4,849,843

DEMAGNETIZER FOR A MAGNETIC HEAD OF A CASSETTE TAPE RECORDER

This application is a continuation of application Ser. No. 067,613, filed 6/26/87 now abandoned.

BACKGROUND OF THE INVENTION

The present invention relates to a magnetic head demagnetizer, in particular, relates to such a demagnetizer which is mounted in a tape cassette. This kind of prior art head demagnetizer is shown in the Japanese patent publication 10765/83.

FIG. 5 shows a prior head demagnetizer which is mounted in a tape cassette 1. The tape cassette 1 has a pair of holes $H_1$ and $H_2$, and an erasing head 7. The tape cassette 1 is positioned in a magnetic tape recorder which is subject to erasure. The tape cassette 1 is positioned so that the holes $H_1$ and $H_2$ are engaged with spindles of a tape recorder, and then, the erase head 7 touches with a magnetic head 15 which is subject to erasure.

However, a demagnetizer of FIG. 5 has the disadvantage that it is sometimes not applicable to a particular structure of a magnetic tape recorder. That is to say, lately there are cassette tape recorders, which are for instance mounted on a vehicle, that function to prevent the loosening and/or twisting of a tape. Those tape recorders have a magnetic recording/reproducing head which is first shifted from a normal position. In operation of those kind of tape recorders, a tape is first wound up so that a tape has some tension, then, a recording/reproducing head is shifted so that it contacts with a tape for recording and/or reproducing operation.

When a head demagnetizer of FIG. 5 is mounted in that kind of tape recorder, a spindle of the tape recorder would first rotate so that a tape has tension. However, since it is a demagnetizer that is mounted on the tape recorder, not a cassette tape for recording/reproducing, the initial wind up operation for providing tape tension does not finish, and the spindle rotates needlessly. And, since the erase head 7 does not contact with the magnetic head 15 because of the absence of tension on a tape, the magnetic head 15 can not be erased.

FIG. 6 is another prior head demagnetizer which solved the above problem. In FIG. 6, the numeral 1 is a cassette holder, 7 is an erase head, 15 is a magnetic head which is subject to erasure, 2C and 2D are reels, and 20 is a cleaning tape which runs between the reels 2C and 2D through the face of the heads 7 and 15. The cleaning tape 20 functions to clean the magnetic head 15 by sweeping the face of the head 15.

In operation, when the cassette holder 1 is mounted in a tape recorder, a spindle of the tape recorder rotates to provide tension on a tape. Since a cleaning tape 20 is provided in the cassette holder 1, the cleaning tape 20 has tension and the tape recorder recognized that the tape has tension, then, the magnetic head 15 is shifted so that it touches with the erase head 7. Therefore, the erasing operation is carried out normally.

However, the head demagnetizer of FIG. 6 has the disadvantages that the life time of a cleaning tape is short, and the erasing operation is not reliable since a cleaning tape exists between the erase head 7 and the magnetic head 15 not only in the cleaning operation but also in the erasing operation. Because of the short life time of the cleaning tape, the head demagnetizer itself has the short life time which is the same as that of the cleaning tape.

SUMMARY OF THE INVENTION

It is an object, therefore, of the present invention to overcome the disadvantages and limitations of a prior head demagnetizer by providing a new and improved head demagnetizer.

It is also an object of the present invention to provide a head demagnetizer which is applicable to all the types of cassette tape recorder sets.

It is also an object of the present invention to provide a head demagnetizer which is reliable in the demagnetizing operation.

The above and other objects are attained by a head demagnetizer having a tape cassette housing, a pair of rings rotatably mounted in said housing and each of said rings engaging with a respective spindle of a tape recorder set which is subject to be demagnetized, an erase head mounted in said housing so that said erase head faces with a magnetic head of said tape recorder, energizing means mounted in said housing for providing decreasing alternate current in said erase head, and coupling means for coupling said pair of rings together.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
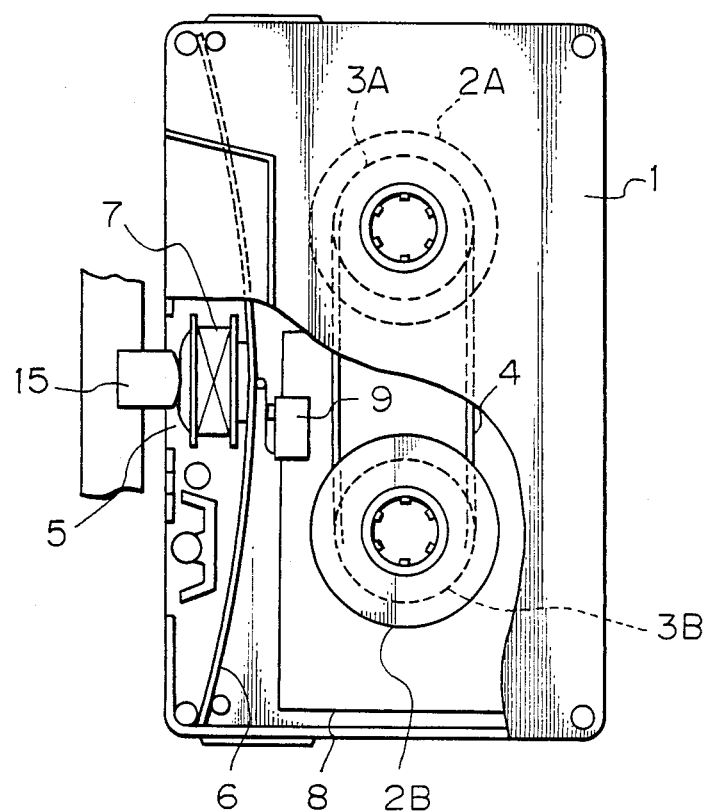
FIG. 1 is a plane view of a cassette type head demagnetizer according to the present invention with some portions fragmented.
Figure 2:
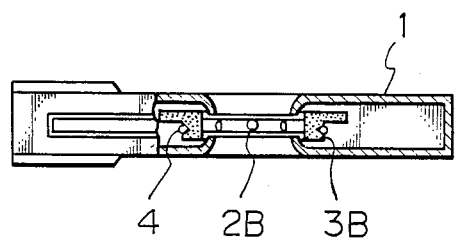
FIG. 2 is a cross sectional view of FIG. 1.
Figure 3:
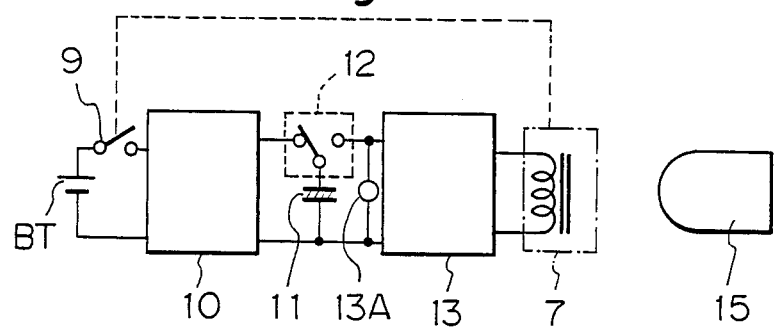
FIG. 3 is a circuit diagram of a head demagnetizer according to the present invention.

Figs.1 and 2 show the head demagnetizer according to the present invention, and FIG. 3 shows the circuit diagram of the head demagnetizer. Of course, the circuit of FIG. 3 is mounted in a tape cassette as shown in FIGS. 1 and 2. In those figures, the numeral 1 is a cassette housing, which has a pair of rings 2A and 2B with some spacing. Each ring has a plurality of inwardly projected chips which engage with a spindle of a tape recorder. Each of those rings 2A and 2B has the pulley 3A and 3B fixed to the respective ring. A belt 4 is engaged with the pulleys 3A and 3B. The cassette housing 1 has an opening 5 on the side wall of the housing for accepting the magnetic head 15 which is subject to erasure. The erase head 7 is positioned by the elongated spring 6 which is supported at both the ends of the same to the housing. The erase head 7 is shiftable in the direction toward the magnetic head 15 by the operation of the spring 6.

The housing 1 includes also the printed circuit board 8, a micro-switch 9 which is switched on when the erase head 7 is pushed by the magnetic head 15, and the battery (not shown).

The printed circuit board 8 mounts a DC-DC converter 10 which boosts the voltage of the battery BT, the capacitor 11 which has relatively large capacitance, the semiconductor switch 12, and the oscillator 13 which operates with the power supply from said capacitor 11.

In operation, when the present head demagnetizer is mounted on a magnetic tape recorder, the spindle of the tape recorder is intended to provide the tension to the tape. Since the belt 4 is provided between the rings 2A and 2B, the tape recorder recognizes if a tape has some tension since the rotation of one of the rings causes the rotation of another ring. Therefore, the tape recorder shifts the magnetic head 15 into the tape cassette housing.

Then, the erase head 7 is pushed by the magnetic head 15 against the spring 6, and the micro-switch 9 is switched on by the shift of the erase head 7.

Then, the power source of the battery BT (FIG. 3) is supplied to the DC-DC converter 10 which boosts the input voltage and provides the high output voltage. The high output voltage is supplied to the capacitor 11 which is thus charged through the switch 12.

The semiconductor switch 12 turns over when the voltage across the capacitor 11 exceeds the predetermined voltage, and the voltage across the capacitor 11 is supplied to the oscillator 13, which generates an alternate signal. The alternate current thus generated by the oscillator 13 is applied to the erase head 7, which generates the magnetic flux for demagnetizing the magnetic head 15.

Since the voltage across the capacitor 11 decreases slowly as the capacitor 11 discharges, the amplitude of the alternate signal by the oscillator decreases slowly. Therefore, it should be appreciated that the erase head 7 provides the erase flux which is initially strong, and attenuates slowly to zero. The attenuating erase flux is preferably for demagnetizing a magnetic head.

Preferably, a lamp (a light emit diode) and/or a buzzer 13A is coupled with the input of the oscillator 13 so that the operation of the oscillator 13 or the demagnetizing operation is indicated by a lamp and/or a buzzer.

Figure 4A:
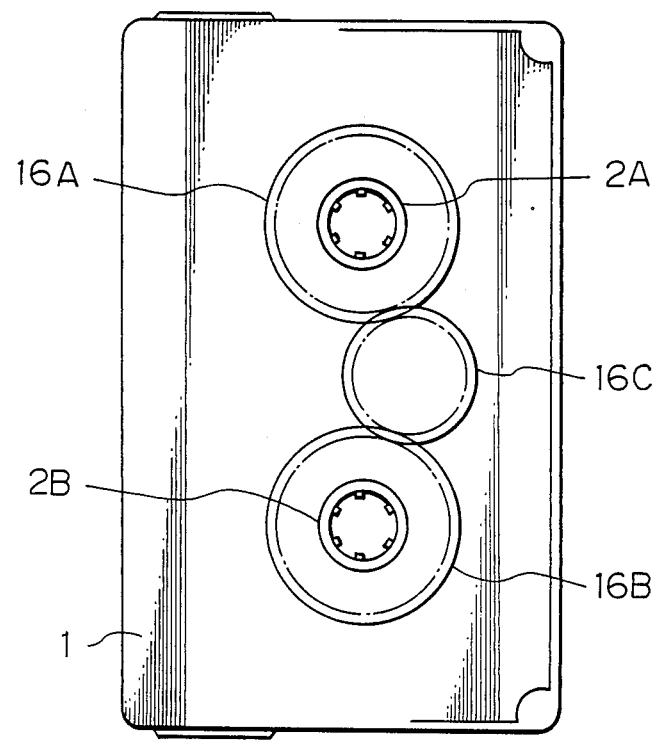
FIG. 4A is a plane view of another embodiment of a head demagnetizer according to the present invention.

FIG. 4A shows another embodiment of the head demagnetizer according to the present invention. The feature of the embodiment of FIG. 4 is the presence of a pair of gears 16A and 16B, together with the gear 16C, instead of pulleys 3A and 3B and the belt 4 in FIG. 1. The gears 16A and 16B are fixed to the rings 2A and 2B, respectively, and the third gear 16C is engaged with the gears 16A and 16B. The other structure of FIG. 4 is the same as that of the embodiment of FIG. 1.

In operation, when the head demagnetizer is mounted on a tape recorder, the tape recorder recognizes as if the tape has some tension, since both the rings 2A and 2B follow the rotation of the spindle. Therefore, the demagnetizing operation is carried out correctly.

It should be noted that the intermediate gear 16C is necessary so that the rings 2A and 2B rotate in the same direction. So, the number of gears must be odd, but not even. As a modification, gears may be replaced by friction pulleys.

Figure 4B:
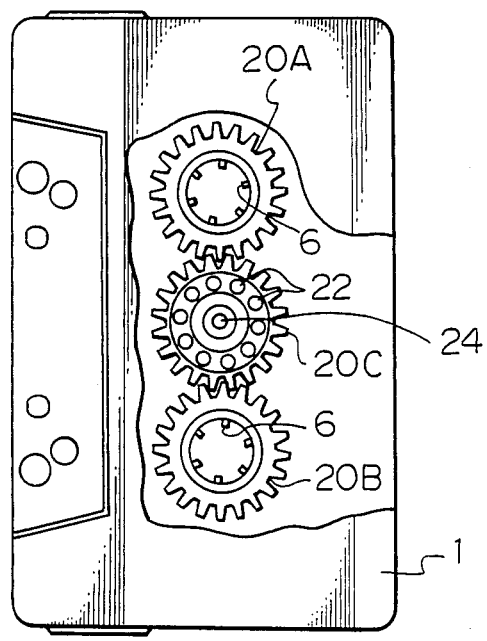
FIG. 4B is a still another embodiment of a head demagnetizer according to the present invention.
Figure 5:
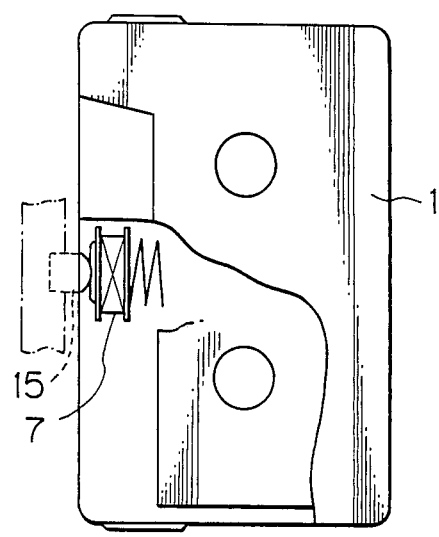
FIG. 5 is a plane view of a prior head demagnetizer.
Figure 6:
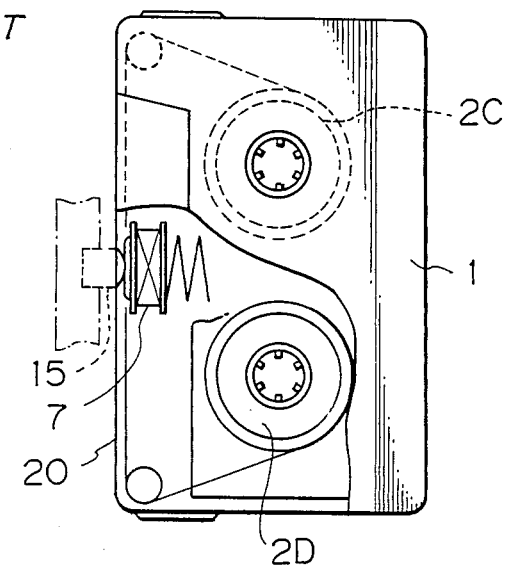
FIG. 6 is a plane view of another prior head demagnetizer.

FIG. 4B is the modification of the embodiment of FIG. 4A. In FIG. 4B, a pair of rings 20A and 20B engage with the spindles of a tape recorder set, and each of said rings has gear teeth on the periphery of the same. The coupling gear 20C is engaged with both the rings 20A and 20B, so that the rotation of a first ring 20A (or 20B) is transferred to the other ring 20B (or 20A). The coupling gear 20C rotates around the axis 24. Preferably, the coupling gear 20C has a plurality of holes 22 around said axis 24, and a light emit diode is mounted behind the holes 22 so that the light blinks as the gear 24 rotates.

It is preferable that a light emit diode is mounted behind the gear 20C, since some of the tape recorder sets have a transparent window around the center of a cassette holder, and if the light emit diode is mounted around that portion, the light is visible through the window of the tape recorder set.

As a further modification of FIG. 4B, the coupling gear 20C may be transparent so that the light behind the gear 20C is visible through the gear 20C.

As described above in detail, the present head demagnetizer has a pair of rings which rotate following the rotation of the spindles of a tape recorder set. Therefore, the tape recorder set recognizes if a tape is mounted on the tape recorder set with the proper tension. Therefore, the tape recorder set shifts the magnetic head into the head demagnetizer, and the erasing operation is carried out normally. Further, it should be appreciated that the erase head touches directly with the magnetic head which is subject to erasure without an intervening cleaning tape, and thus the erasing operation is reliable. Further, the lack of cleaning tape provides the long life time of the head demagnetizer.

From the foregoing it will now be apparent that a new and improved head demagnetizer has been found. It should be appreciated of course that the embodiments disclosed are merely illustrative and are not intended to limit the scope of the invention. Reference should be made to the appended claims, therefore, rather than the specification as indicating the scope of the invention.

What is claimed is:

1. A head demagnetizer for demagnetizing a magnetic head of a tape recorder, comprising:
   (a) a tape cassette housing;
   (b) an erase head mounted in said housing so that said erase head faces the magnetic head of the tape recorder;
   (c) energizing means mounted in the housing for providing decreasing alternating current to the erase head;
   (d) means for providing an indication to the tape recorder so that the tape recorder shifts the magnetic head into contact with the erase head, said means for indicating including:
      (i) a pair of rings rotatably mounted in the housing, each of the rings engaging a respective spindle of the tape recorder, each ring having gear teeth on a periphery thereof, said rings providing said indication to said tape recorder only when both rings are rotated,
      (ii) a gear meshingly engaging with the gear teeth on the pair of rings for rotating one of said rings when said gear is rotated by the other of said rings so that said pair of rings provides said indication to the tape recorder, and said gear having a plurality of holes on a circle of a predetermined radius on said gear with an equal angular interval, and
   (e) a light emit diode coupled electrically with said energizing means, positioned at distance from a center axis of said gear, for indicating operation of said energizing means by blinking a light through said holes.

2. A head demagnetizer according to claim 1, further comprising an elongated spring for pushing said erase head towards outside of the housing, and a switch which is switched on when said erase head is pushed inward against said spring for operating said energizing means.

3. A head demagnetizer according to claim 1, wherein said energizing means has a battery, a capacitor which is charged by said battery, an oscillator output of which is coupled with said erase head, and a semiconductor switch which couples initially said battery with said capacitor, and couples said battery with said oscillator when voltage across said capacitor exceeds a predetermined value.

4. A head demagnetizer according to claim 3, wherein a buzzer is coupled with input of said oscillator for sound-making during operation of said oscillator.

5. A head demagnetizer according to claim 3, wherein a cover of aid housing is transparent so that rotation of said gear and said light emit diode are visible.

* * * * *